United States Patent [19]

Ettischer

[11] 3,890,626

[45] June 17, 1975

[54] ADJUSTING MEANS FOR CAMERAS HAVING SEVERAL LENSES

[75] Inventor: Helmut Ettischer, Stuttgart, Germany

[73] Assignee: Eastman Kodak Company, Rochester, N.Y.

[22] Filed: June 10, 1974

[21] Appl. No.: 477,579

[30] Foreign Application Priority Data

June 14, 1973 Germany.......................... 2330264

[52] U.S. Cl. .............................................. 354/197
[51] Int. Cl. .................................................. G03b 3/00
[58] Field of Search........................ 354/195, 197

[56] References Cited
UNITED STATES PATENTS 2,906,172   9/1959   Klemt ................................ 354/197

Primary Examiner—John M. Horan
Attorney, Agent, or Firm—R. F. Brothers

[57] ABSTRACT

A camera includes a pair of interchangeable lenses, each lens being selectively movable between a stored position out of alignment with the camera's optical axis and a taking position in alignment with the optical axis. At least one of the lenses is focusable, and a movable actuating member is operatively connected to the lenses for moving one lens to its taking position while moving the other lens to its stored position. The actuating member is connected to the focusable lens by gearing so that, when the lens is moved to its taking position, its focus setting can be adjusted by slight movement of the actuating member.

3 Claims, 3 Drawing Figures

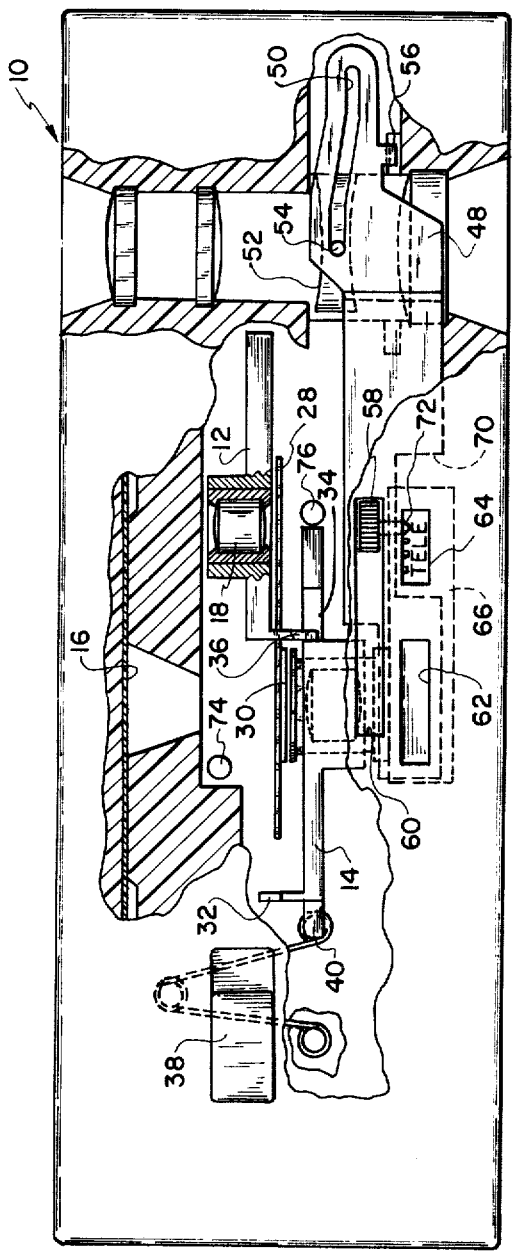

ADJUSTING MEANS FOR CAMERAS HAVING SEVERAL LENSES

BACKGROUND OF THE INVENTION

1. Field of the Invention

The present invention relates to cameras having interchangeable lenses to change the camera's effective focal length, and particularly to such cameras wherein at least one of said lenses is focusable.

2. Description of the Prior Art

Cameras having two or more lenses of different focal lengths which are arranged in an adjustable carrier, such as a rotary turret or slider, are known. Some of these cameras have lenses with fixed focus while others may provide for axial adjustment of the lenses to adjust the focal of the selected lens.

The cameras known in the prior art which provide for focus adjustment commonly include one member for changing the lenses and another, separate member for adjusting the focus of the selected lens. Such a camera is shown in German published application No. 1,095,541. While cameras of this type are suitable for their intended use, the provision of separate lens changing members and focus members add to the cost, the complexity of use and the bulk of the camera.

SUMMARY OF THE INVENTION

Accordingly, it is an object of the present invention to provide a camera with a simplified mechanism wherein the operator may both change the lens and focus the selected lens by manipulation of but a single actuating member.

In keeping with the above object, the illustrated embodiment of the camera according to the present invention includes a plurality of lenses, each lens being selectively movable between a taking position in alignment with the camera's optical axis and a stored position out of alignment with the optical axis. At least one of the lenses is focusable, and a movable actuating member is operatively connected to the lenses for moving one of the lenses to its taking position while moving the other lens to its stored position. Means are provided interconnecting the actuating member and the focusable lens or lenses for adjusting the focus setting of that lens upon movement of the actuating member. Accordingly, the operator is presented with but a single member having dual functions; lens selection and focus.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing in which:

FIG. 3 is a top view partially in section of the camera shown in FIGS. 1 and 2 with the second lens now in the taking position.

DESCRIPTION OF THE PREFERRED EMBODIMENT

Because cameras are well known, the present description will be directed in particular to elements forming part of, or cooperating more directly with apparatus in accordance with the present invention. It is to be understood that camera elements not specifically shown or described may take various forms well known to those skilled in the art.

Figure 1:
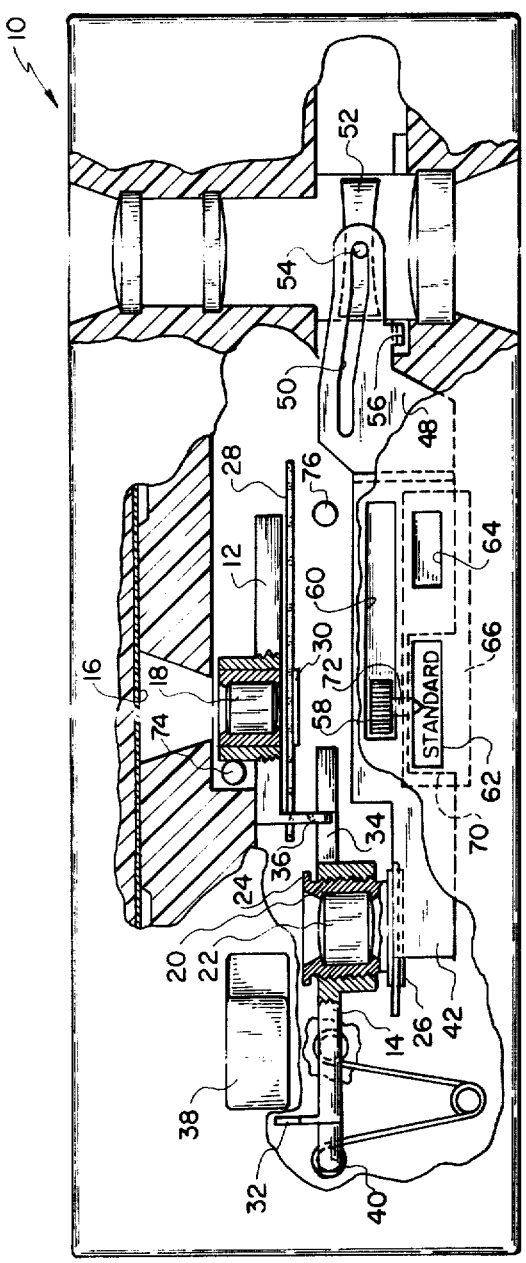
FIG. 1 is a top view partially in section showing a camera in accordance with the present invention, the camera being shown with one of two lenses in the taking position.
Figure 2:
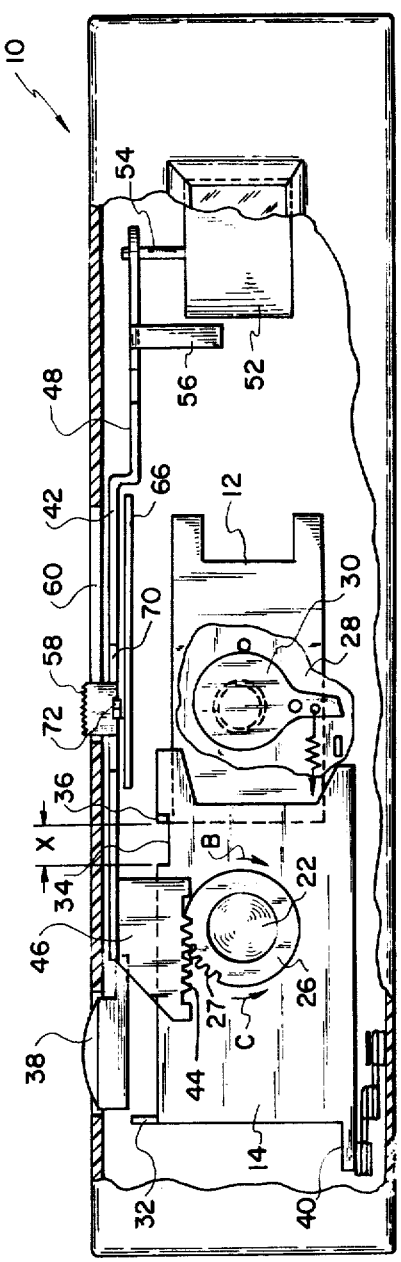
FIG. 2 is a front view partially in section of the camera shown in FIG. 1.

Referring to FIGS. 1 and 2, a camera 10 includes two lens carriers 12 and 14 which are mounted in guides, not shown, and which are displaceable parallel to the camera's film plane 16. Lens carrier 12, which lies towards film plane 16, carries a mount with a standard lens 18, and lens carrier 14, which lies towards the front of the camera, carries a threaded mount 20 with a telephoto lens 22. On its rear side, threaded mount 20 has a collar 24 and, towards the front of the camera, a collar 26 which has on its periphery a toothed segment 27 facing in the direction of the top of the camera. Between the two lens carriers 12 and 14 is a shutter plate 28 with a shutter 30.

In the illustrated embodiment, the lens 18 is designed as a fixed-focus lens of normal or standard focal length. The upper side of lens carrier 14 has a blocking lug 32 and a recess 34 into which there extends an arm 36 which projects from the upper side of lens carrier 12. A camera release member 38 is located next to blocking lug 32. At its outer end, lens carrier 14 further has a leg 40 which is operationally connected with an over-center snap spring system of any conventional configuration.

A slider or actuating member 42 is arranged below the top of the camera for changing the lenses. This slider has toothing 44 on a downwardly extending lug 46, said toothing being operationally connected with the toothed segment 27 of telephoto lens mount 20. At the opposite, free end of slider 42 there is a sliding plate 48 which features an angular slot guide 50 and is operationally connected with an adjustable center element 52 of a viewfinder via a follower pin 54 which protrudes into angular slot guide 50. A warning indicator 56 furthermore extends downwards from sliding plate 48. The upper side of the slider 42 also features a corrugated actuating portion 58 which projects through a slot 60 in the top of the camera. Two openings 62 and 64 are located in the top of the camera parallel to the slot 60.

A plate 66 in the housing underneath slider 46 bears the words "standard" and "tele", together with a distance scale and/or distance symbols on a level with the word tele. As can be seen from FIG. 1, the word standard is in the region of the opening 62 and the word tele and the distance scale and/or distance symbols are in the region of the opening 64. Slider 42 has a recess 70 (FIG. 1) and an index marking 72. Recess 70 corresponds to the rectangular shape of the opening 62 so that the word standard can be seen. Stops 74 and 76 are provided for limiting the travel of lens carriers 12 and 14, respectively.

Operation

As shown in FIGS. 1 and 2, the camera is in the standard lens position. Standard lens 18 being in the image field raypath while the telephoto lens 22 is out of alignment with the camera's optical axis. The word standard is visible in the opening.

If one wishes to use telephoto lens 22 instead of standard lens 18 of normal focal length, one slides actuating portion 58 to the right. During the first phase of this displacement, the cooperating of the toothing 44 and that of the toothed segment 27 on lens mount 20 causes the threaded lens mount 20 of telephoto lens 22 to be rotated in the direction of arrow "B" until collar 26 of threaded lens mount 20 abuts against the end of toothing 44. Now, as actuating portion 58 is moved further, lens carrier 14 which supports telephoto lens 22 is taken along to the right via this same toothing.

In order to save space, the paths along which lens carriers 12 and 14 are slid are of different lengths and are balanced by an initial path "X". For this reason the recess 34, mentioned earlier, is of a width greater than that of the arm 36 by a distance X. When the initial path X has been traveled, the edge of lens carrier 14 engages arm 36 of lens carrier 12 and moves it along too, standard lens 18 hereupon being moved out of the optical axis and telephoto lens 22 into the optical axis of the image field. During this displacement the overcenter snap spring which acts upon lens carrier 14 snaps over into the position shown in FIG. 3 and holds lens carrier 14 to the right. At the same time center element 52 of the viewfinder is displaced via the pin-and-slot connection 50–54 in order to adapt the size of the viewfinder image to telephoto lens 22.

When slider 42 is moved to the left, the word standard in window 62 is covered by the slider, while recess 70 in the slider comes into the region of the window 64 and reveals the word tele along with the distance scale and/or distance symbols. The index marking 72 can also be seen in window 64.

In this position, slider 42 can now be moved back and forth in a specific area by means of actuating portion 58. This area is marked by the distance scale and/or distance symbols which are visible in window 64. By the setting of index marker 72, located on slider 42, to a number on the distance scale and/or to a distance symbol, and the movement of slider 42 thereby incurred, telephoto lens mount 20 is rotated a little into or out of the lens tube for the purpose of focusing the telephoto lens, via the connection between the slider toothing 44 and the toothed segment 27 of telephoto lens mount 20. The overcenter snap spring, which is in the position shown in FIG. 3, prevents lens carrier 14 from being displaced.

During the first phase of the return displacement of slider 42 from telephoto to standard, threaded mount 20 of telephoto lens 22 is rotated in the direction of arrow C until the end of the toothing 44 is reached. Then lens carrier 14 is displaced again and lens carrier 12 is taken along via the arm 36. When the path difference X has been traveled, the lens carrier edge engages and moves along arm 36 of lens carrier 12. The overcenter snap spring acting upon the telephoto lens carrier 14 thereby snaps into the initial position shown in FIG. 1 and holds lens carrier 12 against stop 74.

When the standard lens 18 is in the operative position shown in FIGS. 1 and 2, release member 38 is not obstructed by blocking lug 32 on lens carrier 42 and warning lug 56 on sliding plate 48 is not in the camera viewfinder. When the lens carriers 12 and 14 are in an intermediate position, warning lug 56 becomes visible in the viewfinder and/or the release member 38 is blocked by blocking lug 32.

The invention has been described in detail with particular reference to a preferred embodiment thereof, but it will be understood that variations and modifications can be effected within the spirit and scope of the invention.

I claim:

1. In a camera having an optical axis; a plurality of lenses, each lens being selectively movable between a stored position out of alignment with the optical axis and a taking position in alignment with the optical axis, at least one of said lenses being focusable while in said taking position; and a movable actuating member operatively connected to said lenses for moving one lens to its taking position while moving another lens to its stored position; the improvement comprising means interconnecting said actuating member and said focusable lens for adjusting the focus setting of said focusable lens upon movement of said actuating member.

2. The improvement as defined in claim 1 wherein said actuating member is movable in a first direction to move said focusable lens to its taking position and in a second direction to move another lens to its taking position, partial movement of said actuating member in said second direction focusing said focusable lens without moving said focusable lens from its taking position.

3. The improvement as defined in claim 2 wherein said means interconnecting said actuating member and said focusable lens comprises gearing.

* * * * *